United States Patent
Mukai

(10) Patent No.: US 12,059,756 B2
(45) Date of Patent: Aug. 13, 2024

(54) FLUX-CORED WIRE FOR GAS-SHIELDED ARC WELDING AND WELDING METHOD

(71) Applicant: Kobe Steel, Ltd., Kobe (JP)

(72) Inventor: Naoki Mukai, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 505 days.

(21) Appl. No.: 16/652,133

(22) PCT Filed: Nov. 16, 2018

(86) PCT No.: PCT/JP2018/042390
§ 371 (c)(1),
(2) Date: Mar. 30, 2020

(87) PCT Pub. No.: WO2019/102932
PCT Pub. Date: May 31, 2019

(65) Prior Publication Data
US 2020/0230733 A1 Jul. 23, 2020

(30) Foreign Application Priority Data
Nov. 24, 2017 (JP) ................................ 2017-226089

(51) Int. Cl.
| | | |
|---|---|---|
| B23K 9/173 | (2006.01) | |
| B23K 9/095 | (2006.01) | |
| B23K 35/30 | (2006.01) | |
| B23K 35/368 | (2006.01) | |
| B23K 35/38 | (2006.01) | |
| C22C 38/00 | (2006.01) | |
| C22C 38/02 | (2006.01) | |
| C22C 38/04 | (2006.01) | |
| C22C 38/44 | (2006.01) | |
| C22C 38/48 | (2006.01) | |
| C22C 38/50 | (2006.01) | |

(52) U.S. Cl.
CPC ............ B23K 9/173 (2013.01); B23K 9/0953 (2013.01); B23K 35/3086 (2013.01); B23K 35/368 (2013.01); B23K 35/383 (2013.01); C22C 38/001 (2013.01); C22C 38/02 (2013.01); C22C 38/04 (2013.01); C22C 38/44 (2013.01); C22C 38/48 (2013.01); C22C 38/50 (2013.01)

(58) Field of Classification Search
CPC ......... C22C 38/50; C22C 38/48; C22C 38/44; C22C 38/04; C22C 38/001; B23K 9/173; B23K 9/0953; B23K 35/383; B23K 35/368; B23K 35/3086
See application file for complete search history.

(56) References Cited

U.S. PATENT DOCUMENTS

| | | | | | |
|---|---|---|---|---|---|
| 5,914,061 | A | * | 6/1999 | Ogawa | ............... B23K 35/3608 219/145.22 |
| 8,294,065 | B2 | * | 10/2012 | Mizumoto | .............. C22C 38/60 219/146.24 |
| 8,492,679 | B2 | * | 7/2013 | Sugahara | ........... B23K 35/3605 156/325 |
| 10,702,955 | B2 | * | 7/2020 | Miyata | ................. B23K 35/368 |
| 10,870,178 | B2 | * | 12/2020 | Ishida | ................ B23K 35/3607 |
| 2011/0139761 | A1 | | 6/2011 | Sugahara et al. | |
| 2012/0055903 | A1 | | 3/2012 | Izutani et al. | |
| 2017/0239758 | A1 | | 8/2017 | Ishida et al. | |

FOREIGN PATENT DOCUMENTS

| | | |
|---|---|---|
| CN | 107097016 A | 8/2017 |
| EP | 2 341 159 A1 | 7/2011 |
| EP | 3 208 030 A1 | 8/2017 |
| JP | 1-59079 B2 | 12/1989 |
| JP | 2667635 B2 * | 10/1997 |
| JP | 2667635 B2 | 10/1997 |
| JP | 5289760 B2 * | 9/2013 |
| JP | 5411820 B2 | 2/2014 |
| JP | 6110800 B2 | 4/2017 |
| WO | WO-2017145854 A1 * | 8/2017 |

OTHER PUBLICATIONS

Ishizaki, Ni-based welding material for electroslag welding, 2017 (Year: 2017).*
Machine translation of JP-2667635: Maruyama, High temperature applications for stainless steel flux cored wire, 1997 (Year: 1997).*
Machine translation of JP-5289760: Mizumoto, The flux-cored wire for stainless steel welding and method of manufacturing the same, 2013 (Year: 2013).*
Extended European Search Report issued Mar. 4, 2021 in corresponding European Patent Application No. 18880408.2, 14 pages.
International Search Report issued on Feb. 19, 2019 in PCT/JP2018/042390 filed on Nov. 16, 2018.

* cited by examiner

*Primary Examiner* — Janie M Loeppke
*Assistant Examiner* — Abigail H Rhue
(74) *Attorney, Agent, or Firm* — Oblon, McClelland, Maier & Neustadt, L.L.P.

(57) ABSTRACT

A purpose of the present invention is to provide a flux-cored wire that excels in slag removability and weldability, and is capable of high-efficiency operation without the risk of reheat cracking and makes it possible to obtain a welding bead with high corrosion resistance even when used in equipment operating at high temperature for a long time. The present invention relates to a flux-cored wire for gas-shielded arc welding that is used for welding using a specific shielding gas having a high Ar ratio, includes substantially no As, Sb, Pb and Bi, has slag component and alloy component compositions satisfying predetermined conditions, and satisfies the relationship $\{(3\times[O_2])+[CO_2]+(0.0085\times A^2)-(0.19\times A)\} \leq 20.0$ (where $A=\{[Cr]+(4.3\times[Nb])\}$).

6 Claims, No Drawings

FLUX-CORED WIRE FOR GAS-SHIELDED ARC WELDING AND WELDING METHOD

TECHNICAL FIELD

The present invention relates to a flux-cored wire for gas-shielded arc welding and also relates to a welding method using the flux-cored wire for gas-shielded arc welding.

BACKGROUND ART

Flux-cored wires are widely available welding materials due to their excellent efficiency in the welding operation and good weldability. This also applies to welding of a material, such as stainless steel or a Ni-based alloy, for which corrosion resistance and low-temperature/high-temperature performance are required.

Welding using a flux-cored wire for stainless steel or a flux-cored wire for a Ni-based alloy has a feature that the bead shape is good and defects such as a blowhole and incomplete fusion are unlikely to occur compared with metal inert gas (MIG) welding using a solid wire. To be precise, welding using, as a shielding gas, a gas that contains an active gas, such as $O_2$ or $CO_2$, in an amount of about 2% to 5% and Ar as the balance is referred to as metal active gas (MAG) welding. However, for the sake of convenience, such welding is also collectively referred to as metal inert gas (MIG) welding as a general name.

To most flux-cored wires for stainless steel and flux-cored wires for Ni-based alloys, a slag-forming agent is added primarily for the purpose of protecting a welding bead from the air, and the welding bead is covered with slag. Meanwhile, slag removability is an important factor in terms of weldability.

After completion of the welding operation, the slag becomes an unwanted substance and may cause internal defects when multi-layer welding or overlay welding is performed. Therefore, the slag is removed by using a scale hammer or a chisel. At this time, if the formed slag has poor removability, it takes time to perform the slag removal operation. Furthermore, with the cooling of a weld zone, slag having poor removability may be cracked into small pieces and splash up due to the difference in amount of thermal shrinkage between the slag and a metal. The slag at this time has a temperature that is still high for the human body and is very dangerous because a burn injury may be caused.

In view of the above, Patent Literature 1 discloses that a small amount of a low-melting-point metal element such as Bi or Pb is added for the purpose of improving slag removability, and an oxide of Bi is generally used.

However, when a flux-cored wire containing Bi is used for welding of equipment operating at high temperature for a long time, cracking (reheat cracking) is often generated in a weld zone. This is cracking generated when Bi is concentrated at grain boundaries to locally form a low-melting-point portion, and an opening is thereby formed.

In view of the above, Patent Literatures 2 and 3 disclose flux-cored wires free of Bi as wires used for welding of equipment operating at high temperature. Regarding the term "free of Bi", when the amount of Bi is 0.0010% or less in terms of mass fraction, it can be considered to be substantially free of Bi in accordance with JIS Z 3323: 2007, Table 2, footnote b), and it is known that the reheat cracking is not generated.

Meanwhile, it has been hitherto considered that unless a shielding gas that contains an active gas such as Ar-20% $CO_2$ or $CO_2$ is used, droplet transfer is not stabilized, resulting in bead meandering or scattering of a large amount of spatter, and thus high-quality welding cannot be achieved. In view of this, Patent Literature 4 discloses that even in the case where a shielding gas having a high Ar ratio is used, stable droplet transfer and good weldability are achieved by using a metal-cored wire having an appropriate composition.

CITATION LIST

Patent Literature

PTL 1: Japanese Examined Patent Application Publication No. 1-59079
PTL 2: Japanese Patent No. 2667635
PTL 3: Japanese Patent No. 6110800
PTL 4: Japanese Patent No. 5411820

SUMMARY OF INVENTION

Technical Problem

In the slag type flux-cored wires disclosed in Patent Literatures 2 and 3, slag removability can be somewhat improved by, for example, adjusting the composition of the slag-forming agent or the slag content. However, the slag type flux-cored wires have poor slag removability compared with flux-cored wires to which a low-melting-point element such as, Sb, Pb, or Bi is added, and an improvement is desired.

In the metal-cored wire disclosed in Patent Literature 4, although removal of slag is unnecessary, slag, which protects a welding bead from the air, is not formed, and therefore, the surface of the welding bead is oxidized to form an oxide film that cannot be removed. In particular, under a high heat input condition of a welding heat input of 12.0 kJ/cm (for example, current: 210 A, voltage: 28.5 V, and welding speed: 30 cm/min) or more, the cooling speed becomes low, and the surface of a welding bead is exposed to the air at a high temperature for a long time and is significantly oxidized. In a portion where significant oxidation has occurred, since an oxide film having a high melting point is formed to have a large thickness, the probability of generation of incomplete fusion defects is high in multi-layer welding. Furthermore, in the case of overlay welding, corrosion resistance deteriorates. Therefore, when multi-pass welding is performed in welding of equipment operating at high temperature for a long time, in each weld pass, it is necessary to remove an oxide film on the surface of a bead by using a grinder or the like, which is poor in terms of efficiency.

Accordingly, in order that a flux-cored wire for stainless steel or a flux-cored wire for a Ni-based alloy is used for equipment operating at high temperature for a long time and the excellent, high efficiency of the flux-cored wire is utilized, it is not appropriate to select a metal-cored wire.

In view of the above, an object of the present invention is to provide a flux-cored wire which is a slag type flux-cored wire free of a low-melting-point metal, which makes it possible to perform welding with excellent slag removability and weldability (amount of spatter generation, bead shape, and defect resistance) at high efficiency, and which makes it possible to obtain a welding bead with high corrosion resistance.

Another object is to provide a welding method using the flux-cored wire under a high welding heat input condition.

Solution to Problem

As a result of extensive studies, the inventor of the present invention has found that when a composition of a slag type flux-cored wire and a composition of a shielding gas used are within specific ranges, excellent slag removability is achieved even without incorporation of a low-melting-point metal, good weldability is achieved, a welding bead with high corrosion resistance is obtained, and high-efficiency operation can be realized. This finding led to the realization of the present invention.

Specifically, the present invention relates [1] to [8] below.

[1] A flux-cored wire for gas-shielded arc welding, the wire including a sheath and a flux that fills the sheath, in which the wire is used for gas-shielded arc welding using, as a shielding gas, a gas that satisfies relationships of $0\% \leq [O_2] \leq 5\%$, $0\% \leq [CO_2] \leq 15\%$, and $\{[CO_2]+(3\times[O_2])\} \leq 15$ and that contains Ar as the balance where $[O_2]$ represents a volume fraction of oxygen and $[CO_2]$ represents a volume fraction of carbon dioxide, the flux-cored wire includes substantially no As, Sb, Pb, or Bi, a composition of a slag component in the wire satisfies, in terms of mass fraction with respect to a total mass of the wire, $TiO_2$: 4.00% to 9.00%,
$SiO_2$: 0.30% to 2.00%,
$ZrO_2$: 1.50% to 3.00%,
$Al_2O_3$: 0.30% or less (including 0%), and
MgO: 0.50% or less (including 0%), a composition of an alloy component contained in the sheath and the flux of the wire satisfies, in terms of mass fraction with respect to the total mass of the wire, Cr: 10.00% to 35.00%, and
Nb: 4.50% or less (including 0%), and a relationship $\{(3\times[O_2])+[CO_2]+(0.0085\times A^2)-(0.19\times A)\} \leq 20.0$ is satisfied where [Cr] represents a mass fraction of the Cr and [Nb] represents a mass fraction of the Nb with respect to the total mass of the wire, and $A=\{[Cr]+(4.3\times[Nb])\}$.

[2] The flux-cored wire for gas-shielded arc welding according to [1], in which the composition of the slag component satisfies a relationship $1.15 \leq [\{3\times([ZrO_2]+[MgO])\}+(1.2\times[Al_2O_3])+[TiO_2]+(0.3\times[SiO_2])]/([TiO_2]+[SiO_2]+[ZrO_2]+[Al_2O_3]+[MgO]) \leq 1.75$ where $[TiO_2]$ represents a mass fraction of the $TiO_2$, $[SiO_2]$ represents a mass fraction of the $SiO_2$, $[ZrO_2]$ represents a mass fraction of the $ZrO_2$, $[Al_2O_3]$ represents a mass fraction of the $Al_2O_3$, and [MgO] represents a mass fraction of the MgO with respect to the total mass of the wire.

[3] The flux-cored wire for gas-shielded arc welding according to [1] or [2], in which the composition of the slag component further satisfies a total of values obtained by converting alkali metal components contained in a Na compound, a K compound, and a Li compound into $Na_2O$, $K_2O$, and $Li_2O$, respectively, in terms of mass fraction with respect to the total mass of the wire: 0.25% to 1.50%, an amount of F contained as a metal fluoride in the wire: 0.05% to 0.80%

$Fe_2O_3$: 0.50% or less (including 0%), and an incidental metal oxide: 0.20% or less (including 0%).

[4] The flux-cored wire for gas-shielded arc welding according to any one of [1] to [3], in which a content of the flux in the wire is 8.0% to 30.0% in terms of mass fraction with respect to the total mass of the wire, and a content of the slag component in the flux is 7.0% to 15.0% in terms of mass fraction with respect to the total mass of the wire.

[5] The flux-cored wire for gas-shielded arc welding according to any one of [1] to [4], in which the composition of the alloy component in the wire further satisfies, in terms of mass fraction with respect to the total mass of the wire, C: 0.005% to 0.150%,
Si: 0.05% to 1.50%,
Mn: 0.20% to 3.00%,
Cr: 15.00% to 35.00%,
Ni: 5.00% to 25.00%,
Mo: 5.00% or less (including 0%),
Nb: 2.00% or less (including 0%),
Ti: 1.00% or less (including 0%),
N: 1.00% or less (including 0%), and
the balance: Fe and incidental impurities.

[6] The flux-cored wire for gas-shielded arc welding according to any one of [1] to [4], in which the composition of the alloy component in the wire further satisfies, in terms of mass fraction with respect to the total mass of the wire, C: 0.005% to 0.150%,
Si: 0.05% to 1.00%,
Mn: 0.10% to 4.00%,
Cr: 10.00% to 35.00%,
Fe: 0.10% to 10.00%,
W: 5.00% or less (including 0%),
Mo: 20.00% or less (including 0%),
Nb: 4.50% or less (including 0%),
Co: 2.50% or less (including 0%),
Ti: 1.00% or less (including 0%),
N: 0.50% or less (including 0%), and
the balance: Ni and incidental impurities.

[7] The flux-cored wire for gas-shielded arc welding according to [5] or [6], in which the composition of the alloy component in the wire further satisfies, in terms of mass fraction with respect to the total mass of the wire, S: 0.020% to 0.100%.

[8] A welding method comprising performing welding by using the flux-cored wire for gas-shielded arc welding according to any one of [1] to [7] with a welding heat input (F) in a range of $10.0 \leq F \leq 19.0$, the welding heat input being represented by a formula below:

Welding heat input(F)(kJ/cm)=current(A)×voltage (V)/welding speed (cm/s)/1000.

Advantageous Effects of Invention

According to the present invention, welding that excels in slag removability and weldability (amount of spatter generation, bead shape, and defect resistance) can be performed at high efficiency, and furthermore, a welding bead with high corrosion resistance can be obtained.

DESCRIPTION OF EMBODIMENTS

Hereafter, embodiments for carrying out the present invention will be described in detail. It is to be understood that the present invention is not limited to the embodiments described below. In the present description, "to" is used to mean that the numerical values described before and after that are included as the lower limit value and the upper limit value.

A flux-cored wire for gas-shielded arc welding according to the present embodiment (hereinafter, may be simply referred to as a "flux-cored wire" or a "wire") includes a sheath and a flux that fills the sheath.

In welding using the wire of the present embodiment, a gas that satisfies relationships of $0\% \leq [O_2] \leq 5\%$, $0\% \leq [CO_2] \leq 15\%$, and $\{[CO_2]+(3\times[O_2])\} \leq 15$ and that contains Ar as the balance is used as a shielding gas where $[O_2]$ represents a volume fraction of oxygen and $[CO_2]$ represents a volume fraction of carbon dioxide.

The wire of the present embodiment is a slag type flux-cored wire including substantially no As, Sb, Pb, or Bi. A composition of a slag component in the wire satisfies, in terms of mass fraction with respect to a total mass of the wire, $TiO_2$: 4.00% to 9.00%,
$SiO_2$: 0.30% to 2.00%,
$ZrO_2$: 1.50% to 3.00%,
$Al_2O_3$: 0.30% or less (including 0%), and
MgO: 0.50% or less (including 0%).

In the wire of the present embodiment, a composition of an alloy component contained in the sheath and the flux of the wire satisfies, in terms of mass fraction with respect to the total mass of the wire, Cr: 10.00% to 35.00%, and
Nb: 4.50% or less (including 0%), and
a relationship $\{(3\times[O_2])+[CO_2]+(0.0085\times A^2)-(0.19\times A)\} \leq 20.0$ is satisfied
where [Cr] represents a mass fraction of the Cr, [Nb] represents a mass fraction of the Nb, and $A=\{[Cr]+(4.3\times[Nb])\}$.

Note that the phrase "including substantially no As, Sb, Pb, or Bi" means that none of As, Sb, Pb, and Bi is actively added, and the total content of As, Sb, Pb, and Bi is controlled to 0.0010% or less in terms of mass fraction with respect to the total mass of the wire.

(Slag Component)

A slag component in the wire according to the present embodiment is a component contained as a metal oxide or a metal fluoride, and is contained in the flux.

The content of the slag component in the flux directly relates to the amount of slag generated during welding and affects a covering performance of slag and slag inclusion defect resistance. The content of the slag component in the flux is preferably 7.0% or more in terms of mass fraction with respect to the total mass of the wire from the viewpoint that the amount of slag generated relative to the surface area of a welding bead is not insufficient and the entire surface of the bead can be covered. The content of the slag component in the flux is more preferably 8.0% or more. The content of the slag component in the flux is preferably 15.0% or less in terms of mass fraction with respect to the total mass of the wire from the viewpoint that the amount of slag generated is not excessively large and slag inclusion defects can be suppressed. The content of the slag component in the flux is more preferably 13.5% or less.

The content of the slag component means a total content of metal oxides and metal fluorides that are contained in the flux.

$TiO_2$ is added as a main component of a slag-forming agent having a good covering performance. Examples of the source of $TiO_2$ include rutile, titanium oxide, potassium titanate, and sodium titanate.

When a mass fraction (hereinafter, may be referred to as a "content") of $TiO_2$ with respect to the total mass of the wire is less than 4.00%, the covering performance of slag is poor, resulting in deterioration of the bead shape. Furthermore, since surface oxidation occurs in a portion where the weld metal is exposed, there is a concern about deterioration of corrosion resistance. On the other hand, when the $TiO_2$ content exceeds 9.00%, the slag becomes hard, resulting in deterioration of the removability. Therefore, the $TiO_2$ content is 4.00% to 9.00%, preferably 6.00% or more and preferably 8.50% or less.

$SiO_2$ has an effect of improving wettability of a bead toe and obtaining a smooth bead. Examples of the source of $SiO_2$ include silica sand, wollastonite, potassium feldspar, and sodium feldspar.

When the $SiO_2$ content is less than 0.30%, the above effect is not obtained. When $SiO_2$ content exceeds 2.00%, the slag has an excessively low melting point, resulting in deterioration of the bead shape. Therefore, the $SiO_2$ content is 0.30% to 2.00%, preferably 0.50% or more and preferably 1.60% or less.

$ZrO_2$ is a component that adjusts the melting point of the slag and that improves the bead shape. Examples of the source of $ZrO_2$ include zircon sand and a zirconium oxide powder.

When the $ZrO_2$ content is less than 1.50% or exceeds 3.00%, the timing of solidification of the molten metal does not match with the timing of solidification of the slag, resulting in deterioration of the bead shape. Therefore, the $ZrO_2$ content is 1.50% to 3.00%, preferably 1.80% or more and preferably 2.50% or less.

$Al_2O_3$ may be added as required for the purpose of adjustment for improving the covering performance of slag by obtaining a suitable slag viscosity. An example of the source of $Al_2O_3$ is an alumina powder.

When the $Al_2O_3$ content exceeds 0.30%, the slag has an excessively high viscosity, and slag inclusion defects tend to be generated. Therefore, the $Al_2O_3$ content is 0.30% or less (including 0%), preferably 0.20% or less.

MgO may be added as required because MgO is effective to adjust the melting point of the slag as in $ZrO_2$. Examples of the source of MgO include magnesite and magnesia clinker.

When the MgO content exceeds 0.50%, sticking of the slag tends to occur. Therefore, the MgO content is 0.50% or less (including 0%), preferably 0.30% or less.

The flux-cored wire according to the present embodiment is used as a wire for gas-shielded arc welding using a shielding gas having a high Ar ratio. It is generally known that when welding is performed by using a shielding gas having a high Ar ratio, the use of an existing flux-cored wire tends to increase spatter because, as the welding current increases, the droplet transfer tends to be changed to an unstable droplet transfer mode such as streaming transfer or rotating transfer.

It has been found that, in contrast, in welding performed by using a shielding gas having a high Ar ratio, when the content of each slag component in a flux-cored wire satisfies a composition balance within a specific range, a flux column is formed in an arc, a droplet can be transferred along the flux column to significantly stabilize the droplet transfer, and the generation of spatter is extremely suppressed.

Specifically, when a value represented by $[\{3\times([ZrO_2]+[MgO])\}+(1.2\times[Al_2O_3])+[TiO_2]+(0.3\times[SiO_2])]/([TiO_2]+[SiO_2]+[ZrO_2]+[Al_2O_3]+[MgO])$ is preferably 1.15 or more because the above effect is obtained without an excessive decrease in the melting point of the slag where $[TiO_2]$ represents a mass fraction of $TiO_2$, $[SiO_2]$ represents a mass fraction of $SiO_2$, $[ZrO_2]$ represents a mass fraction of $ZrO_2$, $[Al_2O_3]$ represents a mass fraction of $Al_2O_3$, and $[MgO]$ represents a mass fraction of MgO with respect to the total mass of the wire. The value represented by the above formula is preferably 1.75 or less because a flux column is fed, in a sufficiently molten state, into a molten pool without an excessive increase in the melting point of the slag, and thus the generation of slag inclusion defects is suppressed.

The value represented by the formula is more preferably 1.20 or more, still more preferably 1.25 or more. The value represented by the formula is more preferably 1.60 or less, still more preferably 1.50 or less.

In the coefficients in the above formula, a weight is assigned to each of the oxides on the basis of the difference between the melting point of the oxide and the melting point of steel. The validity of the formula and a good numerical range are determined by experiments.

The melting points of the oxides are as follows.
$TiO_2$: 1870° C.
$SiO_2$: 1650° C.
$ZrO_2$: 2715° C.
$Al_2O_3$: 2072° C.
MgO: 2852° C.

The slag component may further contain at least one alkali metal compound such as a Na compound, a K compound, and/or a Li compound. Examples of the source of the alkali metal compound include potassium feldspar, sodium feldspar, lithium ferrite, sodium fluoride, and potassium fluorosilicate.

The content of alkali metal components contained in the Na compound, the K compound, and the Li compound relative to the total mass of the wire is preferably 0.25% or more in terms of mass fraction of a total of values obtained by converting the alkali metal components into oxides, that is, values obtained by converting the alkali metal components into $Na_2O$, $K_2O$, and $Li_2O$ because the arc is stabilized, and the amount of spatter generation is reduced. The content of the alkali metal components contained in the Na compound, the K compound, and the Li compound relative to the total mass of the wire is preferably 1.50% or less in terms of mass fraction of a total of values obtained by converting the alkali metal components into $Na_2O$, $K_2O$, and $Li_2O$ because it is possible to suppress generation of porosity defects such as a pit and a blowhole caused by an increase in the water content in the wire due to high hygroscopicity of the alkali metal compounds. The content of the alkali metal components is more preferably 1.00% or less.

The slag component may further contain a metal fluoride. Examples of the source of the metal fluoride include calcium fluoride, sodium fluoride, and potassium fluorosilicate.

The content of the metal fluoride relative to the total mass of the wire is preferably 0.05% or more in terms of F because good arc stability is obtained. The content of the metal fluoride is more preferably 0.15% or more. The content of the metal fluoride relative to the total mass of the wire is preferably 0.80% or less in terms of F because a good covering performance of the slag can be maintained without decreasing the viscosity of the slag. The content of the metal fluoride is more preferably 0.60% or less.

The slag component may further contain $Fe_2O_3$. Examples of the source of $Fe_2O_3$ include potassium feldspar, sodium feldspar, and other substances contained in an ore as impurities.

The mass fraction of $Fe_2O_3$ with respect to the total mass of the wire is preferably 0.50% or less (including 0%) because sticking of the slag can be suppressed. The mass fraction of $Fe_2O_3$ is more preferably 0.30% or less.

The slag component can contain, besides the components described above, incidental metal oxides such as $V_2O_5$, $Nb_2O_5$, CaO, and oxides of rare earth metals. When the amount of the impurities incidentally contained in rutile or other ores is very small, properties of the wire are not significantly affected. However, if the impurities are contained in an excessive amount, the slag composition may be out of balance, and slag removability may deteriorate. Therefore, the mass fraction of the incidental metal oxides with respect to the total mass of the wire is preferably 0.20% or less (including 0%).

(Alloy Component)

An alloy component in the wire according to the present embodiment is a component which is contained as a pure metal, an alloy, a carbide (complex metal carbide), or a nitride (complex metal nitride) and most of which forms the weld metal, and is a component contained in at least one of the sheath and the flux of the wire.

In the alloy component, Cr and Nb are components that are particularly easily oxidized. Excessively high mass fractions (contents) of Cr and Nb with respect to the total mass of the wire may disturb the balance of the slag component composition and deteriorate slag removability, unless the purity of Ar in the shielding gas is increased. In addition, Cr is a component that particularly significantly affects corrosion resistance of the weld metal. Therefore, the Cr content is 10.00% or more and 35.00% or less, preferably 12.00% or more and preferably 30.00% or less.

In addition, Nb is a component that further improves corrosion resistance by immobilizing C to prevent Cr and C from binding to each other (prevention of sensitization). Furthermore, in a Ni-based alloy, Nb may have a function of improving strength by precipitating Nb carbide. Therefore, the Nb content is 4.50% or less (including 0%), preferably 4.00% or less. In the case where the effect of improving corrosion resistance (sensitization resistance) and the effect, of improving strength are particularly desired, the Nb content is preferably 0.4% or more.

Besides Cr and Nb described above, the alloy component in the present embodiment is not particularly limited. It is possible to use, for example, a composition similar to that of an alloy component in a typical flux-cored wire for stainless steel or flux-cored wire for a nickel-based alloy.

In the flux-cored wire for stainless steel or the flux-cored wire for a nickel-based alloy, S is a component that significantly decreases the surface tension of the molten metal to activate the convection of the molten metal, and is a component capable of making the bead shape flat and good. The flat bead shape enables slag removability to be further improved. Therefore, the S content is preferably 0.020% or more, more preferably 0.025% or more. On the other hand, S is a component that are segregated at grain boundaries, generates a low-melting-point compound, and deteriorates hot cracking resistance. Therefore, the S content is preferably 0.100% or less, more preferably 0.080% or less.

The alloy component composition of the flux-cored wire for stainless steel preferably satisfies, for example, in terms of mass fraction with respect to the total mass of the wire, C: 0.005% to 0.150%, Si: 0.05% to 1.50%, Mn: 0.20% to 3.00%, Cr: 15.00% to 35.00%, Ni: 5.00% to 25.00%, Mo: 5.00% or less (including 0%), Nb: 2.00% or less (including 0%), Ti: 1.00% or less (including 0%), N: 1.00% or less (including 0%), and the balance: Fe and incidental impurities.

C is a component that affects corrosion resistance of the weld metal, and thus the C content is preferably as small as possible. On the other hand, a low-C material having a low C content has low economic efficiency. Therefore, the C content is preferably 0.005% to 0.150%.

Si is a component that improves strength of the weld metal, whereas Si is a component that deteriorates toughness. In addition, a low-Si material having a low Si content has low economic efficiency. In view of the balance between these performances, the Si content is preferably 0.05% to 1.50%.

Mn is a component that improves strength of the weld metal, whereas Mn is a component that increases welding fumes when contained in a larger amount than necessary. In view of the balance between these performances, the Mn content is preferably 0.20% to 3.00%.

Cr is a component that improves corrosion resistance of the weld metal. On the other hand, Cr is a component that reacts with an oxidizing shielding gas and generates an oxide and that affects the balance of the slag component, composition when contained in a larger amount than necessary. Therefore, the Cr content, is preferably 15.00% to 35.00%.

Ni is a component that stabilizes the austenite structure of the weld metal to improve toughness at low temperature, and is a component that is added in a certain amount for the purpose of adjusting the amount of crystallized ferrite structure. The amount of Ni added may be in a range in which Ni is generally added as stainless steel. It is suitable to add Ni in an amount of 25% or less. Therefore, the Ni content is preferably 5.00% to 25.00%.

Mo is a component that improves high-temperature strength and pitting corrosion resistance, whereas Mo is a component that promotes σ embrittlement. Accordingly, Mo is not actively added except for the case where high-temperature strength or pitting corrosion resistance is particularly required. The Mo content is preferably 5.00% or less (including 0%).

Nb and Ti are each a component that has an effect of stabilization by binding to C and that improves corrosion resistance. On the other hand, if Nb or Ti is contained in a larger amount than necessary, a low-melting-point compound is generated at grain boundaries, and solidification cracking resistance is deteriorated. Furthermore, Nb and Ti easily react with an oxidizing shielding gas and generate an oxide. Although the effect of $TiO_2$ is not clear because $TiO_2$ is actively added as a slag component, Nb oxide affects the balance of the slag component composition. Therefore, Nb and Ti are not actively added except for the case where corrosion resistance is particularly required. The Nb content is preferably 2.00% or less (including 0%), and the Ti content is preferably 1.00% or less (including 0%).

N is a component that forms an interstitial solid solution in the crystal structure to improve strength and to further improve pitting corrosion resistance. On the other hand, N may cause the generation of porosity defects such as a blowhole and a pit in the weld metal. Therefore, N is not actively added except for the case where strength or pitting corrosion resistance is particularly required. The N content is preferably 1.00% or less (including 0%).

The balance is Fe and incidental impurities. Examples of the incidental impurities include V, P, Cu, Sn, Na, Co, Ca, Li, Sb, W, and As. When each element is contained as an oxide, O is also contained in the balance.

The sheath of the flux-cored wire for stainless steel is also not particularly limited. For example, carbon steel, SUH409L (JIS G 4312: 2001), SUS430, SUS304L, SUS316L, and SUS310S (all of which are specified in JIS G 4305: 2012), and the like call be used.

The alloy component composition of the flux-cored wire for a Ni-based alloy preferably satisfies, for example, in terms of mass fraction with respect to the total mass of the wire, C: 0.005% to 0.150%, Si: 0.05% to 1.00%, Mn: 0.10% to 4.00%, Cr: 10.00% to 35.00%, Fe: 0.10% to 10.00%, W: 5.00% or less (including 0%), Mo: 20.00% or less (including 0%), Nb: 4.50% or less (including 0%), Co: 2.50% or less (including 0%), Ti: 1.00% or less (including 0%), N: 0.50% or less (including 0%), and the balance: Ni and incidental impurities.

C is a component that binds to an element such as Nb and is finely precipitated to thereby improve strength of the weld metal. On the other hand, C is a component that deteriorates corrosion resistance. In addition, a low-C material has low economic efficiency. In view of the balance between these performances, the C content is preferably 0.005% to 0.150%.

Si is a component that improves strength of the weld metal, whereas Si is a component that deteriorates toughness, as in the flux-cored wire for stainless steel. In addition, a low-Si material has low economic efficiency. In view of the balance between these performances, the Si content is preferably 0.05% to 1.00%.

Mn is a component that improves strength of the weld metal, whereas Mn is a component that increases welding fumes. In view of the balance between these performances, the Mn content is preferably 0.10% to 4.00%.

Cr is a component that improves corrosion resistance of the weld metal. On the other hand, Cr is a component that reacts with an oxidizing shielding gas and generates an oxide and that affects the balance of the slag component composition. Therefore, the Cr content is preferably 10.00% to 35.00%.

Fe is a component that is added in order to improve economic efficiency of the weld metal to the extent that mechanical properties, corrosion resistance, and the like are not adversely affected. In particular, providing an alloy material that has an extremely small Fe content significantly decreases economic efficiency. Therefore, the Fe content is preferably 0.10% or more. The upper limit of the Fe content is 10.00% or less.

W and Mo are each a component that improves high-temperature strength and pitting corrosion resistance. On the other hand, if W and Mo are added in excessively large amounts, W particles and Mo particles that have not been melted may be present as defects in a scattered manner because W and Mo have very high melting points. Therefore, the W content is preferably 5.00% or less (including 0%), and the Mo content is preferably 20.00% or less (including 0%).

Nb is a component that binds to C to improve strength of the molten metal. On the other hand, Nb is a component that generates a low-melting-point compound at grain boundaries and deteriorates solidification cracking resistance. Furthermore, Nb is a component that reacts with an oxidizing shielding gas, generates an oxide, and affects the balance of the slag component composition. Therefore, Nb is not actively added except for the case where strength is particularly required. The Nb content is preferably 4.50% or less (including 0%).

Co is a component that stabilizes the austenite structure as in Ni. In addition, Co is a component that is incidentally contained because Co is contained in a typical Ni material as an impurity in a relatively large amount. On the other hand, Co has extremely low economic efficiency, and thus it is not preferred to actively add Co. The Co content is preferably 2.50% or less (including 0%).

Ti is a component that binds to Ni and precipitates a metallic compound of $Ni_3Ti$ to improve high-temperature strength. On the other hand, Ti is a component that deteriorates ductility and toughness. Therefore, Ti is not actively added except for the case where high-temperature strength is particularly required. The Ti content is preferably 1.00% or less (including 0%).

N is a component that forms an interstitial solid solution in the crystal structure to improve strength and to further improve pitting corrosion resistance. On the other hand, N may cause the generation of porosity defects such as a blowhole and a pit in the weld metal. Therefore, N is not actively added except for the case where strength or pitting corrosion resistance is particularly required. The N content is preferably 0.50% or less (including 0%).

The balance is Ni and incidental impurities. Examples of the incidental impurities include V, P, Cu, Sn, Na, Ca, Li, Sb, and As. When each element is contained as an oxide, O is also contained in the balance.

The sheath of the flux-cored wire for a Ni-based alloy is also not particularly limited. For example, Alloy600 (UNS N06600), Alloy625 (UNS N06625), Alloy22 (UNS N06022), Alloy276 (UNS N10276), and the like can be used.

In the flux-cored wire according to the present embodiment, when the amount of flux relative to the internal cavity formed by the sheath is small, it is difficult to form a flux column during welding. Furthermore, the flux moves in the wire. In such a case, there is a concern that the flux content in the longitudinal direction of the wire varies depending on, for example, a vibration state of a production line of the wire, and the wire quality may become unstable. Therefore, the content of the flux in the wire is preferably 8.0% or more, more preferably 13.0% or more in terms of mass fraction with respect to the total mass of the wire.

On the other hand, in order to enclose a large amount of flux with a small amount of sheath, a thin sheath material may be used. However, in the case where the sheath material has an extremely small thickness, there is a concern that the sheath material may tear in a step of drawing the wire, and the wire may be ruptured. Therefore, the content of the flux in the wire is preferably 30.0% or less, more preferably 28.0% or less.

The wire diameter of the flux-cored wire is not particularly limited. Considering the combination with a typical welding apparatus and weldability, the diameter is preferably 1.2 to 2.0 mm, more preferably 1.6 mm or less.

(Shielding Gas)

The flux-cored wire according to the present embodiment is used together with a shielding gas having a high Ar ratio.

On the other hand, when the shielding gas has a high content of an active gas component, the alloy component contained in the wire is oxidized and incorporated in the slag, and the slag component composition may be out of balance. The active gas component includes oxygen and carbon dioxide. Oxygen has a stronger effect of oxidizing the alloy component than carbon dioxide.

In the present embodiment, a gas that satisfies relationships of $0\% \leq [O_2] \leq 5\%$, $0\% \leq [CO_2] \leq 15\%$, and $\{[CO_2]+(3\times[O_2])\} \leq 15$ where $[O_2]$ represents a volume fraction of oxygen and $[CO_2]$ represents a volume fraction of carbon dioxide and that contains Ar as the balance is used as the shielding gas.

The shielding gas is preferably a gas that satisfies relationships of $0\% \leq [O_2] \leq 4\%$, $0\% \leq [CO_2] \leq 12\%$, and $\{[CO_2]+(3\times[O_2])\} \leq 12$ and that contains Ar as the balance, more preferably a gas that satisfies relationships of $0\% \leq [O_2] \leq 3\%$, $0\% \leq [CO_2] \leq 9\%$, and $\{[CO_2]+(3\times[O_2])\} \leq 9$ and that contains Ar as the balance. A gas of pure Ar ($[O_2]=0\%$ and $[CO_2]=0\%$) is also preferred.

As described above, in the alloy component, Cr and Nb are components that are particularly easily oxidized. Accordingly, Cr and Nb significantly affect the balance of the slag component composition depending on the values of $[O_2]$ and $[CO_2]$ in the shielding gas. Therefore, in the present embodiment, a value represented by a relational expression of $$\{(3\times[O_2])+[CO_2]+(0.0085\times A^2)-(0.19\times A)\}$$

is 20.0 or less where [Cr] represents a mass fraction of Cr, [Nb] represents a mass fraction of Nb, and $A=\{[Cr]+(4.3\times[Nb])\}$.

In the expression, the value 4.3 which is a coefficient, of [Nb] is a value derived from results of a test in which the amounts of Cr and Nb added in a wire were independently changed. Beads were rated in view of slag removability, and as a result of a regression calculation, this coefficient was obtained. The value 3 which is a coefficient of $[O_2]$ is a value derived from results of a test in which the volume fractions of $CO_2$ and $O_2$ in the shielding gas were independently changed. According to the results of the comparison of beads in view of slag removability, it was concluded that the degree of influence of $O_2$ is about three times that of $CO_2$. This coefficient was obtained from the conclusion. The value 0.0085 which is a coefficient of $A^2$ and the value 0.19 which is a coefficient of A were adopted by the following reason. According to the test results plotted on the horizontal axis that represents A and the vertical axis that represents $(3\times[O_2])+[CO_2]$, it was found that whether good or bad is determined by an expression with these coefficients.

The value represented by the relational expression is preferably 15.4 or less from the viewpoint of slag removability.

In existing metal-cored wire for stainless steel and for a Ni-based alloy, the metal-cored wires that are free of As, Sb, Pb, and Bi, when welding is performed under a high heat input condition, it is necessary to take measures for preventing a welding bead from being oxidized by, for example, using a welding torch having a very large shielding nozzle diameter or using a jig for after shielding, the jig shielding the rear of a welding torch. However, the wire according to the present embodiment can suppress oxidation of the bead surface without taking the measures described above. Therefore, even in the case where welding is performed under a high heat input condition, it is not necessary to take special measures for oxidation of a welding bead. Accordingly, a welding torch having a common shielding nozzle diameter (for example, a welding torch having an inner diameter of 13 to 19 mm) can be used, and the welding apparatus can be simplified.

(Welding Heat Input)

Even in existing metal-cored wires for stainless steel and for a Ni-based alloy, the metal-cored wires being free of As, Sb, Pb, and Bi, oxidation of the bead surface can be reduced by performing welding with a low heat input, and therefore, relatively good welding can be performed. However, welding in a range of high heat input significantly oxidizes the bead surface, resulting in poor weldability.

In contrast, in the flux-cored wire according to the present embodiment, oxidation of the bead surface is suppressed, and good weldability is achieved in welding not only under a low heat, input condition but also with a high heat input.

From the viewpoint of achieving the features (advantages) of the flux-cored wire according to the present embodiment, the flux-cored wire according to the present embodiment is preferably used for welding under a certain degree or higher heat input condition. On the other hand, if a uselessly high heat input condition is selected, there are concerns that, for example, spatter frequently occurs and that the amount of weld metal becomes excessively large relative to weld penetration, and a defect of an overlap is induced.

Therefore, a welding operation is preferably performed by using the flux-cored wire according to the present embodiment under a condition that a value F (kJ/cm) of a welding heat input represented by the following formula is in a range of 10.0 or more and 19.0 or less. Welding heat input (F) (kJ/cm)=current (A)×voltage (V)/welding speed (cm/s)/1000

(Production Method)

The flux-cored wire according to the present embodiment can be produced by a method similar to an existing method, and the production method is not particularly limited. For example, first, a sheath is filled with a flux. At this time, the composition of the sheath and the composition and content of the flux are appropriately adjusted so as to be in the ranges described above. Subsequently, the wire that includes the sheath filled with the flux is rolled or drawn to thereby reduce the diameter. Thus, a flux-cored wire having a predetermined outer diameter can be obtained.

EXAMPLES

The present invention will now be more specifically described with reference to Examples. However, the present invention is not limited by these Examples and can be carried out by adding modifications within the range that can conform to the gist of the present invention. Such modifications are each encompassed by the technical scope of the present invention.

[Evaluation Methods]

Welding was performed under the welding condition C-1 or C-2 described below. Slag removability, weldability, and corrosion resistance were evaluated by the methods described below. Regarding the weldability, evaluations of an amount of spatter generation, a bead shape, and defect resistance were conducted.

(Welding Condition C-1)

A SUS304 plate having a thickness of 12 mm was used as a base metal, and flat-position bead-on-plate welding was performed by gas-shielded arc welding under the conditions of a welding current of 280 A, a welding voltage of 24 to 30 V, and a welding speed of 0.6 cm/s. The weld length was 400 mm, and a bead was overlaid in three passes while aiming a toe of the previous pass. Thus, four-pass welding was performed as a whole.

(Welding Condition C-2)

A SUS304 plate having a thickness of 12 mm was used as a base metal, and flat-position bead-on-plate welding was performed by gas-shielded arc welding under the conditions of a welding current of 370 A, a welding voltage of 31 to 32 V, and a welding speed of 0.6 cm/s. The weld length was 400 mm, and a bead was overlaid in three passes while aiming a toe of the previous pass. Thus, four-pass welding was performed as a whole.

(Slag Removability)

For slag after welding, slag removability was evaluated in accordance with the following criteria. A to C are satisfactory, and D is unsatisfactory.

A: The slag is naturally released over the entire surface or substantially the entire surface. Very good.

B: Part of the slag is naturally released, and the other part of the slag can also be easily released by hitting with a scale hammer. Good.

C: The Slag can be released with a chisel and a scale hammer. Allowable limit.

D: A slag releasing operation using a grinder is necessary. Poor.

(Amount of Spatter Generation)

Boxes prepared by using a copper plate (the boxes each having a rectangular parallelepiped shape with a height of 200 mm, a width of 100 mm, and a length of 500 mm and being formed of a copper plate except for one side surface with a size of 200 mm×500 mm, the two boxes each having the one open side surface being disposed at positions 30 mm apart from a weld line so as to face each other) were disposed on both side surfaces of a weld zone, and welding was performed. All spatters collected in the boxes during welding of 400 mm in the first pass were taken from the inside of the boxes. The collected spatters were classified into spatters with a size of less than 1.0 mm and spatters with a size of 1.0 mm or more by using a sieve having a mesh size of 1.0 mm. Subsequently, the masses were each measured, and an evaluation was conducted in accordance with the following criteria. A to C are satisfactory, and D is unsatisfactory.

A: A sample in which the amount of spatters with a size of 1.0 mm or more is 0 g and the amount of spatters with a size of 1.0 mm or less is 0.5 g or less.

B: A sample in which the amount of spatters with a size of 1.0 mm or more is 0.2 g or less and the amount of spatters with a size of 1.0 mm or less is 0.7 g or less.

C: A sample in which the amount of spatters with a size of 1.0 mm or more is 0.5 g or less and the amount of spatters with a size of 1.0 mm or less is 1.0 g or less.

D: A sample in which the amount of spatters with a size of 1.0 mm or more is more than 0.5 g and/or the amount of spatters with a size of 1.0 mm or less is more than 1.0 g.

(Read Shape)

For a bead, the bead shape was evaluated by visual observation. The evaluation criteria are as described below. A and B are satisfactory, and C is unsatisfactory. Note that a flank angle means an angle formed by the surface of the base metal and an end portion of the bead.

A: A sample which is considered to be good in a state where an incomplete fusion defect is probably not generated in a bead overlay portion and which has a flank angle of about 120° or more.

B: A sample in a state where an evaluation can be performed in combination with the results of an X-ray radiographic examination, the sample having a flank angle of about 100° or more and less than about 120°.

C: A sample which is considered to be poor in a state where an incomplete fusion defect may be generated in a bead overlay portion and which has a flank angle of less than about 100°.

(Defect Resistance)

With regard to a first-layer weld zone (including a crater) after welding, the presence or absence of defects was determined by the X-ray radiographic examination in accordance with JIS Z3106: 2001, and an evaluation was conducted in accordance with the following criteria. A and B are satisfactory, and C is unsatisfactory.

A: A sample having no defect.

B: A sample in which cracking is generated only in the crater, and a point-like defect with a size of 0.5 mm or less is observed.

C: A sample in which a linear defect is observed in a weld zone other than the crater by cracking, incomplete fusion, and/or slag inclusion or a sample in which a round-shaped defect is observed and which is classified into Classes 2 to 4 of Type 1 in Table 5 in Appendix 4 of JIS Z3106: 2001.

(Corrosion Resistance)

The resulting base metal after welding was cut to have a size of 60×145 mm, and covering was performed so as to leave a weld bead portion of 40×125 mm. A neutral salt spray test was conducted in accordance with JIS Z2371: 2015. The spraying was continuously performed for 168 hours, and the evaluation was conducted in accordance with the following criteria. A to C are satisfactory, and D is unsatisfactory.

A: A sample having a rating number of 10, the rating number being determined by the rating number method in Appendix JC of JIS 22371:2015.

B: A sample having a rating number of 9 or more and 9.8 or less.

C: A sample having a rating number of 3 or more and 8 or less.

D: A sample having a rating number of 2 or less (including 0).

Test Examples

A welding test was performed by using flux-cored wires (W-1 to W-49) having the compositions shown in Tables 1 to 4. Wires W-1 to W-39 are flux-cored wires for stainless steel. Wires W-40 to W-49 are flux-cored wires for Ni-based alloys.

In Tables 1 and 3, the "parameter $\alpha$" represents a relational expression represented by $[\{3\times([ZrO_2]+[MgO])\}+(1.2\times[Al_2O_3])+[TiO_2]+(0.3\times[SiO_2])]/\{[TiO_2]+[SiO_2]+[ZrO_2]+[Al_2O_3]+[MgO]\}$, the "$Na_2O+K_2O+Li_2O$" means a total of values obtained by converting alkali metal components contained in a Na compound, a K compound, and a Li compound into oxides ($Na_2O$, $K_2O$, and $Li_2O$, respectively), and the "metal fluoride" means an amount of F contained as a metal fluoride in the wire. In Table 1 to 4, the component compositions, the slag content, and the flux content are each a value represented in terms of mass fraction with respect to a total mass of the wire, and the symbol "−" represents that an addition is not actively performed.

The conditions for the welding test (Test Examples 1 to 67) are shown in Table 5. Test Examples 1 to 8, 13 to 16, 19 to 22, 25 to 29, 31 to 33, 36 to 47, and 50 to 67 are Examples. Test examples 9 to 12, 17, 18, 23, 24, 30, 34, and 35 are Comparative Examples. Test Example 48 is a reference example in which wire W-38 containing a low-melting-point metal was used. Test Example 49 is a reference example in which wire W-39, which was a metal-cored wire, was used.

The "parameter $\beta$" in Table 5 represents a relational expression represented by $\{(3\times[O_2])+[CO_2]+(0.0085\times A^2)-(0.19\times A)\}$, and the compositions of G-1 to G-11 in the "shielding gas" are shown in Table 6.

Table 7 shows the results of the slag removability, the weldability, and the corrosion resistance after the welding test. In Table 7, the symbol "*" in the "corrosion resistance" means that the evaluation of corrosion resistance is not performed. The reason why the evaluation was not performed is as follows. Wires W-40 to W-49 are flux-cored wires for Ni-based alloys. Originally, rust due to salt spray is not formed on Ni-based alloys. Therefore, it is assumed that there is no significant difference even if the corrosion resistance test is performed.

TABLE 1

| No. | Slag component composition in wire (mass fraction) | | | | | | | | | | Slag content (mass fraction) |
|---|---|---|---|---|---|---|---|---|---|---|---|
| | $TiO_2$ | $SiO_2$ | $ZrO_2$ | $Al_2O_3$ | MgO | Parameter $\alpha$ | $Na_2O + K_2O + Li_2O$ | Metal fluoride | $Fe_2O_3$ | Other oxide | |
| W-1 | 3.71 | 0.93 | 2.39 | 0.05 | — | 1.58 | 0.87 | 0.52 | 0.15 | 0.08 | 8.7 |
| W-2 | 4.20 | 0.93 | 2.39 | 0.05 | — | 1.55 | 0.87 | 0.52 | 0.16 | 0.09 | 9.3 |
| W-3 | 6.13 | 0.95 | 2.41 | 0.05 | — | 1.44 | 0.87 | 0.52 | 0.20 | 0.11 | 11.3 |
| W-4 | 7.32 | 0.96 | 2.42 | 0.06 | — | 1.39 | 0.87 | 0.52 | 0.23 | 0.13 | 12.6 |
| W-5 | 8.31 | 0.97 | 2.43 | 0.06 | — | 1.36 | 0.87 | 0.52 | 0.25 | 0.14 | 13.6 |
| W-6 | 8.82 | 0.95 | 2.44 | 0.06 | — | 1.34 | 0.87 | 0.52 | 0.26 | 0.14 | 14.1 |
| W-7 | 9.24 | 0.95 | 2.44 | 0.06 | — | 1.33 | 0.87 | 0.52 | 0.27 | 0.15 | 14.6 |
| W-8 | 6.13 | 0.23 | 2.15 | 0.05 | 0.27 | 1.53 | 0.23 | 0.22 | 0.15 | 0.08 | 9.6 |
| W-9 | 6.13 | 0.33 | 2.15 | 0.05 | 0.27 | 1.52 | 0.23 | 0.22 | 0.15 | 0.08 | 9.7 |
| W-10 | 6.13 | 0.53 | 2.15 | 0.05 | 0.27 | 1.49 | 0.45 | 0.35 | 0.17 | 0.09 | 10.3 |
| W-11 | 6.13 | 1.48 | 2.15 | 0.05 | 0.27 | 1.38 | 1.05 | 0.52 | 0.25 | 0.12 | 12.1 |
| W-12 | 6.13 | 1.96 | 2.15 | 0.05 | 0.27 | 1.33 | 1.36 | 0.52 | 0.28 | 0.13 | 12.9 |
| W-13 | 6.13 | 2.16 | 2.15 | 0.05 | 0.27 | 1.31 | 1.67 | 0.52 | 0.30 | 0.14 | 13.4 |
| W-14 | 7.32 | 0.65 | 1.39 | — | 0.46 | 1.33 | 0.20 | 0.09 | 0.20 | 0.09 | 10.5 |
| W-15 | 7.32 | 0.68 | 1.55 | — | 0.46 | 1.35 | 0.28 | 0.22 | 0.20 | 0.10 | 10.9 |
| W-16 | 7.32 | 0.73 | 1.90 | — | 0.46 | 1.40 | 0.46 | 0.52 | 0.21 | 0.11 | 11.8 |
| W-17 | 7.32 | 0.77 | 2.15 | — | 0.46 | 1.44 | 0.60 | 0.75 | 0.21 | 0.12 | 12.5 |
| W-18 | 7.32 | 0.81 | 2.41 | — | 0.46 | 1.47 | 0.29 | 0.09 | 0.21 | 0.10 | 11.8 |
| W-19 | 7.32 | 0.90 | 2.98 | — | 0.46 | 1.54 | 0.34 | 0.22 | 0.22 | 0.10 | 12.6 |
| W-20 | 7.32 | 0.92 | 3.06 | — | 0.46 | 1.54 | 0.55 | 0.75 | 0.22 | 0.12 | 13.5 |
| W-21 | 6.13 | 0.95 | 2.15 | 0.05 | 0.27 | 1.44 | 0.45 | 0.35 | 0.20 | 0.09 | 10.7 |
| W-22 | 6.13 | 0.95 | 2.15 | 0.17 | 0.27 | 1.44 | 0.45 | 0.35 | 0.22 | 0.09 | 10.8 |

TABLE 1-continued

| | Slag component composition in wire (mass fraction) | | | | | | | | | Slag content (mass fraction) |
|---|---|---|---|---|---|---|---|---|---|---|
| No. | $TiO_2$ | $SiO_2$ | $ZrO_2$ | $Al_2O_3$ | MgO | Parameter α | $Na_2O + K_2O + Li_2O$ | Metal fluoride | $Fe_2O_3$ | Other oxide | |
| W-23 | 6.13 | 0.95 | 2.15 | 0.28 | 0.08 | 1.40 | 0.45 | 0.35 | 0.23 | 0.09 | 10.8 |
| W-24 | 6.13 | 0.95 | 2.15 | 0.35 | 0.08 | 1.40 | 0.45 | 0.35 | 0.23 | 0.09 | 10.8 |
| W-25 | 6.13 | 1.00 | 2.15 | 0.28 | 0.53 | 1.47 | 0.45 | 0.35 | 0.23 | 0.09 | 11.3 |
| W-26 | 8.85 | 1.96 | 1.52 | 0.05 | 0.03 | 1.14 | 0.87 | 0.52 | 0.34 | 0.14 | 14.4 |
| W-27 | 8.70 | 1.85 | 1.70 | 0.05 | 0.08 | 1.18 | 0.87 | 0.52 | 0.33 | 0.14 | 14.3 |
| W-28 | 8.20 | 1.65 | 1.85 | 0.05 | 0.08 | 1.23 | 0.87 | 0.52 | 0.30 | 0.14 | 13.7 |
| W-29 | 7.32 | 1.48 | 2.15 | 0.10 | 0.25 | 1.33 | 0.87 | 0.52 | 0.27 | 0.13 | 13.2 |
| W-30 | 6.13 | 1.48 | 2.98 | 0.10 | 0.25 | 1.50 | 0.87 | 0.52 | 0.25 | 0.11 | 12.8 |
| W-31 | 6.13 | 0.95 | 2.98 | 0.10 | 0.25 | 1.56 | 0.45 | 0.35 | 0.21 | 0.09 | 11.6 |
| W-32 | 4.80 | 0.53 | 2.98 | 0.10 | 0.25 | 1.71 | 0.45 | 0.35 | 0.15 | 0.08 | 9.7 |
| W-33 | 4.20 | 0.33 | 2.98 | 0.28 | 0.44 | 1.81 | 0.23 | 0.22 | 0.14 | 0.06 | 8.9 |
| W-34 | 4.20 | 0.53 | 1.90 | — | — | 1.52 | 0.23 | 0.22 | 0.13 | 0.06 | 7.3 |
| W-35 | 7.32 | 0.96 | 2.42 | 0.06 | — | 1.39 | 0.87 | 0.52 | 0.23 | 0.13 | 12.6 |
| W-36 | 6.13 | 0.33 | 2.15 | 0.05 | 0.27 | 1.52 | 0.23 | 0.22 | 0.15 | 0.08 | 9.7 |
| W-37 | 7.32 | 0.90 | 2.98 | — | 0.46 | 1.54 | 0.34 | 0.22 | 0.22 | 0.10 | 12.6 |
| W-38 | 9.24 | 0.95 | 2.44 | 0.06 | — | 1.33 | 0.87 | 0.52 | 0.27 | 0.15 | 14.6 |
| W-39 | 0.30 | 0.10 | 0.02 | — | — | 0.93 | 0.08 | 0.00 | 0.03 | 0.01 | 0.6 |

TABLE 2

| | Alloy component composition in wire (mass fraction) | | | | | | | | | | | | Flux content (mass fraction) | Wire diameter (mm) | Wire sheath material |
|---|---|---|---|---|---|---|---|---|---|---|---|---|---|---|---|
| No. | C | Si | Mn | Cr | Ni | Mo | Nb | Ti | N | W | S | As + Sb + Pb + Bi | | | |
| W-1 | 0.097 | 0.32 | 0.64 | 34.47 | 10.56 | 0.20 | <0.01 | 0.04 | 0.03 | <0.01 | <0.01 | <0.0010 | 30.0 | 1.6 | SUS304L |
| W-2 | 0.088 | 0.88 | 0.59 | 32.80 | 11.50 | 0.21 | <0.01 | 0.05 | 0.02 | <0.01 | <0.01 | <0.0010 | 28.0 | 1.6 | SUS304L |
| W-3 | 0.061 | 1.25 | 1.65 | 33.45 | 9.53 | 0.03 | 0.01 | 0.03 | 0.02 | <0.01 | <0.01 | <0.0010 | 30.0 | 1.6 | SUS304L |
| W-4 | 0.055 | 0.54 | 2.83 | 31.10 | 10.43 | 0.38 | <0.01 | 0.05 | 0.04 | <0.01 | <0.01 | <0.0010 | 30.0 | 1.6 | SUS304L |
| W-5 | 0.008 | 0.11 | 2.12 | 22.91 | 12.91 | 0.13 | 0.01 | 0.04 | 0.04 | <0.01 | <0.01 | <0.0010 | 26.0 | 1.6 | SUS304L |
| W-6 | 0.072 | 0.88 | 0.52 | 24.25 | 12.41 | 0.13 | 0.01 | 0.03 | 0.04 | <0.01 | <0.01 | <0.0010 | 26.0 | 1.6 | SUS304L |
| W-7 | 0.060 | 0.47 | 2.77 | 22.85 | 14.00 | 0.05 | 0.01 | 0.01 | 0.03 | <0.01 | <0.01 | <0.0010 | 26.0 | 1.6 | SUS304L |
| W-8 | 0.067 | 0.80 | 0.68 | 19.02 | 11.12 | 2.82 | <0.01 | 0.03 | 0.03 | <0.01 | <0.01 | <0.0010 | 17.0 | 1.2 | SUS316L |
| W-9 | 0.077 | 0.59 | 2.87 | 18.69 | 11.69 | 2.28 | 0.01 | 0.01 | 0.02 | <0.01 | <0.01 | <0.0010 | 17.0 | 1.2 | SUS316L |
| W-10 | 0.114 | 1.46 | 1.95 | 19.63 | 12.46 | 2.49 | 0.01 | 0.01 | 0.02 | <0.01 | <0.01 | <0.0010 | 20.0 | 1.2 | SUS316L |
| W-11 | 0.085 | 0.41 | 0.44 | 18.01 | 15.17 | 4.70 | 0.01 | 0.01 | 0.03 | <0.01 | <0.01 | <0.0010 | 24.0 | 1.2 | SUS316L |
| W-12 | 0.049 | 0.87 | 2.24 | 18.43 | 14.01 | 4.76 | 0.01 | 0.04 | 0.03 | <0.01 | <0.01 | <0.0010 | 24.0 | 1.2 | SUS316L |
| W-13 | 0.046 | 1.17 | 1.58 | 18.83 | 13.81 | 4.29 | 0.01 | 0.02 | 0.04 | <0.01 | <0.01 | <0.0010 | 24.0 | 1.2 | SUS316L |
| W-14 | 0.039 | 0.63 | 2.23 | 25.64 | 20.44 | 0.07 | 0.01 | 0.01 | 0.03 | <0.01 | <0.01 | <0.0010 | 17.0 | 1.6 | SUS310S |
| W-15 | 0.049 | 1.00 | 1.40 | 26.13 | 22.42 | 0.37 | <0.01 | 0.02 | 0.04 | <0.01 | <0.01 | <0.0010 | 21.0 | 1.6 | SUS310S |
| W-16 | 0.132 | 0.45 | 2.47 | 27.18 | 21.60 | 0.03 | <0.01 | 0.03 | 0.02 | <0.01 | <0.01 | <0.0010 | 21.0 | 1.6 | SUS310S |
| W-17 | 0.110 | 0.20 | 2.66 | 18.71 | 9.38 | 0.08 | <0.01 | 0.01 | 0.02 | <0.01 | <0.01 | <0.0010 | 21.0 | 1.6 | SUS304L |
| W-18 | 0.050 | 1.37 | 0.28 | 20.95 | 10.41 | 0.20 | <0.01 | 0.02 | 0.04 | <0.01 | <0.01 | <0.0010 | 21.0 | 1.6 | SUS304L |
| W-19 | 0.093 | 1.32 | 1.71 | 19.83 | 9.60 | 0.01 | <0.01 | 0.01 | 0.04 | <0.01 | <0.01 | <0.0010 | 21.0 | 1.6 | SUS304L |
| W-20 | 0.066 | 0.38 | 1.77 | 19.40 | 10.33 | 0.02 | <0.01 | 0.01 | 0.04 | <0.01 | <0.01 | <0.0010 | 21.0 | 1.6 | SUS304L |
| W-21 | 0.024 | 1.06 | 2.72 | 16.84 | 5.68 | 0.14 | 1.98 | 0.02 | 0.03 | <0.01 | <0.01 | <0.0010 | 23.0 | 1.6 | SUS430 |
| W-22 | 0.014 | 1.03 | 1.72 | 15.71 | 5.52 | 0.27 | 1.47 | 0.01 | 0.02 | <0.01 | <0.01 | <0.0010 | 23.0 | 1.6 | SUS430 |
| W-23 | 0.121 | 0.32 | 1.87 | 15.23 | 5.23 | 0.04 | 1.72 | 0.03 | 0.03 | <0.01 | <0.01 | <0.0010 | 23.0 | 1.6 | SUS430 |
| W-24 | 0.039 | 0.91 | 0.62 | 16.44 | 5.00 | 0.28 | 0.01 | 0.73 | 0.04 | <0.01 | <0.01 | <0.0010 | 23.0 | 1.6 | SUH409L |
| W-25 | 0.048 | 1.28 | 2.82 | 15.93 | 5.41 | 0.43 | <0.01 | 0.91 | 0.04 | <0.01 | <0.01 | <0.0010 | 23.0 | 1.6 | SUH409L |
| W-26 | 0.117 | 0.94 | 1.16 | 22.92 | 9.74 | 3.76 | <0.01 | 0.02 | 0.49 | <0.01 | <0.01 | <0.0010 | 27.0 | 1.2 | SUS304L |
| W-27 | 0.059 | 0.24 | 0.79 | 21.07 | 9.35 | 2.95 | 0.01 | 0.02 | 0.28 | <0.01 | <0.01 | <0.0010 | 27.0 | 1.2 | SUS304L |
| W-28 | 0.094 | 1.06 | 1.51 | 22.50 | 9.76 | 2.86 | 0.01 | 0.02 | 0.12 | <0.01 | <0.01 | <0.0010 | 27.0 | 1.2 | SUS304L |
| W-29 | 0.145 | 0.95 | 0.96 | 23.67 | 10.39 | 2.95 | <0.01 | 0.04 | 0.59 | <0.01 | <0.01 | <0.0010 | 27.0 | 1.2 | SUS316L |
| W-30 | 0.024 | 0.13 | 2.45 | 26.61 | 10.62 | 3.33 | <0.01 | 0.01 | 0.66 | <0.01 | <0.01 | <0.0010 | 27.0 | 1.2 | SUS316L |
| W-31 | 0.032 | 0.61 | 1.37 | 23.48 | 10.93 | 2.84 | 0.01 | 0.04 | 0.42 | <0.01 | <0.01 | <0.0010 | 27.0 | 1.2 | SUS316L |
| W-32 | 0.070 | 0.32 | 0.23 | 18.40 | 9.35 | 0.16 | 1.45 | 0.02 | 0.03 | <0.01 | <0.01 | <0.0010 | 14.0 | 2.0 | SUS304L |
| W-33 | 0.014 | 0.44 | 1.26 | 18.31 | 10.59 | 0.32 | 0.55 | 0.05 | 0.03 | <0.01 | <0.01 | <0.0010 | 14.0 | 2.0 | SUS304L |
| W-34 | 0.043 | 0.31 | 0.57 | 18.43 | 9.67 | 0.42 | 0.86 | 0.04 | 0.03 | <0.01 | <0.01 | <0.0010 | 11.0 | 1.6 | SUS304L |
| W-35 | 0.058 | 0.42 | 1.70 | 19.36 | 10.28 | 0.02 | <0.01 | <0.01 | 0.04 | <0.01 | 0.023 | <0.0010 | 21.0 | 1.6 | SUS304L |
| W-36 | 0.075 | 0.55 | 2.63 | 18.76 | 11.78 | 2.33 | 0.01 | 0.01 | 0.03 | <0.01 | 0.064 | <0.0010 | 17.0 | 1.2 | SUS316L |
| W-37 | 0.063 | 1.32 | 1.71 | 33.21 | 9.66 | 0.03 | 0.01 | 0.02 | 0.02 | <0.01 | 0.089 | <0.0010 | 21.0 | 1.6 | SUS304L |
| W-38 | 0.058 | 0.49 | 2.85 | 22.78 | 13.95 | 0.04 | 0.01 | 0.01 | 0.03 | <0.01 | <0.01 | 0.0114 | 26.0 | 1.6 | SUS304L |
| W-39 | 0.032 | 0.63 | 2.15 | 22.45 | 13.57 | 0.02 | 0.00 | 0.01 | 0.03 | <0.01 | <0.01 | <0.0010 | 21.0 | 1.6 | SUS304L |

* The balance is Fe and incidental impurities.

TABLE 3

| No. | TiO$_2$ | SiO$_2$ | ZrO$_2$ | Al$_2$O$_3$ | MgO | Parameter α | Na$_2$O + K$_2$O + Li$_2$O | Metal fluoride | Fe$_2$O$_3$ | Other oxide | Slag content (mass fraction) |
|---|---|---|---|---|---|---|---|---|---|---|---|
| W-40 | 7.32 | 0.96 | 2.42 | 0.06 | — | 1.39 | 0.87 | 0.52 | 0.23 | 0.13 | 12.6 |
| W-41 | 7.32 | 0.96 | 2.42 | 0.06 | — | 1.39 | 0.87 | 0.52 | 0.23 | 0.13 | 12.6 |
| W-42 | 7.32 | 0.96 | 2.42 | 0.06 | — | 1.39 | 0.87 | 0.52 | 0.23 | 0.13 | 12.6 |
| W-43 | 7.32 | 0.96 | 2.42 | 0.06 | — | 1.39 | 0.87 | 0.52 | 0.23 | 0.13 | 12.6 |
| W-44 | 7.32 | 0.96 | 2.42 | 0.06 | — | 1.39 | 0.87 | 0.52 | 0.23 | 0.13 | 12.6 |
| W-45 | 6.13 | 0.95 | 2.15 | 0.17 | 0.27 | 1.44 | 0.45 | 0.35 | 0.22 | 0.09 | 10.8 |
| W-46 | 6.13 | 0.95 | 2.15 | 0.17 | 0.27 | 1.44 | 0.45 | 0.35 | 0.22 | 0.09 | 10.8 |
| W-47 | 6.13 | 0.95 | 2.15 | 0.17 | 0.27 | 1.44 | 0.45 | 0.35 | 0.22 | 0.09 | 10.8 |
| W-48 | 6.13 | 0.95 | 2.15 | 0.17 | 0.27 | 1.44 | 0.45 | 0.35 | 0.22 | 0.09 | 10.8 |
| W-49 | 6.13 | 0.95 | 2.15 | 0.17 | 0.27 | 1.44 | 0.45 | 0.35 | 0.22 | 0.09 | 10.8 |

TABLE 4

| No. | C | Si | Mn | Cr | Mo | Nb | Ti | N | Fe | W | S | As + Sb + Pb + Bi | Flux content (mass fraction) | Wire diameter (mm) | Wire sheath material |
|---|---|---|---|---|---|---|---|---|---|---|---|---|---|---|---|
| W-40 | 0.049 | 0.36 | 2.83 | 19.32 | 0.39 | 2.19 | 0.01 | 0.02 | 2.17 | 0.17 | <0.01 | <0.0010 | 20.0 | 1.6 | Alloy600 |
| W-41 | 0.063 | 0.50 | 0.31 | 21.64 | 8.86 | 3.21 | 0.02 | 0.03 | 4.18 | 0.01 | <0.01 | <0.0010 | 20.0 | 1.6 | Alloy625 |
| W-42 | 0.066 | 0.26 | 0.52 | 29.41 | 0.08 | 0.01 | 0.72 | 0.03 | 8.22 | 0.04 | <0.01 | <0.0010 | 30.0 | 1.6 | Alloy600 |
| W-43 | 0.071 | 0.13 | 0.86 | 22.39 | 13.12 | 0.01 | 0.02 | 0.03 | 2.81 | 2.71 | <0.01 | <0.0010 | 22.0 | 1.6 | Alloy22 |
| W-44 | 0.024 | 0.40 | 0.95 | 16.17 | 16.86 | 0.02 | 0.00 | 0.02 | 6.37 | 4.13 | <0.01 | <0.0010 | 22.0 | 1.6 | Alloy276 |
| W-45 | 0.068 | 0.38 | 2.76 | 19.20 | 0.49 | 2.75 | 0.00 | 0.03 | 2.01 | 0.19 | <0.01 | <0.0010 | 20.0 | 1.6 | Alloy600 |
| W-46 | 0.057 | 0.48 | 0.28 | 21.37 | 8.56 | 3.29 | 0.02 | 0.04 | 4.06 | 0.50 | 0.025 | <0.0010 | 20.0 | 1.6 | Alloy625 |
| W-47 | 0.081 | 0.33 | 0.54 | 29.04 | 0.32 | 0.02 | 0.68 | 0.02 | 7.98 | 0.06 | <0.01 | <0.0010 | 28.0 | 1.6 | Alloy600 |
| W-48 | 0.082 | 0.15 | 0.90 | 23.04 | 12.89 | 0.01 | 0.03 | 0.02 | 2.67 | 2.58 | <0.01 | <0.0010 | 22.0 | 1.6 | Alloy22 |
| W-49 | 0.015 | 0.22 | 0.91 | 16.43 | 16.45 | 0.01 | 0.01 | 0.03 | 6.05 | 3.88 | 0.029 | <0.0010 | 22.0 | 1.6 | Alloy276 |

* The balance is Ni and incidental impurities.

TABLE 5

| Test Example | Shielding gas | Wire No. | Parameter β | Welding conditions | Current [A] | Voltage [V] | Welding speed [cm/s] | Welding heat input [kJ/cm] |
|---|---|---|---|---|---|---|---|---|
| 1 | G-1 | W-5 | 0.1 | C-1 | 280 | 24 | 0.6 | 11.2 |
| 2 | G-2 | W-5 | 9.1 | C-1 | 280 | 26 | 0.6 | 12.1 |
| 3 | G-3 | W-5 | 12.1 | C-1 | 280 | 26 | 0.6 | 12.1 |
| 4 | G-4 | W-5 | 15.1 | C-1 | 280 | 27 | 0.6 | 12.6 |
| 5 | G-5 | W-5 | 9.1 | C-1 | 280 | 26 | 0.6 | 12.1 |
| 6 | G-6 | W-5 | 12.1 | C-1 | 280 | 26 | 0.6 | 12.1 |
| 7 | G-7 | W-5 | 15.1 | C-1 | 280 | 27 | 0.6 | 12.6 |
| 8 | G-8 | W-5 | 14.1 | C-1 | 280 | 27 | 0.6 | 12.6 |
| 9 | G-9 | W-5 | 30.1 | C-1 | 280 | 30 | 0.6 | 14.0 |
| 10 | G-10 | W-5 | 20.1 | C-1 | 280 | 28 | 0.6 | 13.1 |
| 11 | G-11 | W-5 | 17.1 | C-1 | 280 | 27 | 0.6 | 12.6 |
| 12 | G-2 | W-1 | 12.6 | C-1 | 280 | 26 | 0.6 | 12.1 |
| 13 | G-2 | W-2 | 11.9 | C-1 | 280 | 26 | 0.6 | 12.1 |
| 14 | G-2 | W-3 | 12.2 | C-1 | 280 | 26 | 0.6 | 12.1 |
| 15 | G-2 | W-4 | 11.3 | C-1 | 280 | 26 | 0.6 | 12.1 |
| 16 | G-2 | W-6 | 9.4 | C-1 | 280 | 26 | 0.6 | 12.1 |
| 17 | G-2 | W-7 | 9.1 | C-1 | 280 | 26 | 0.6 | 12.1 |
| 18 | G-2 | W-8 | 8.5 | C-1 | 280 | 26 | 0.6 | 12.1 |
| 19 | G-2 | W-9 | 8.4 | C-1 | 280 | 26 | 0.6 | 12.1 |
| 20 | G-2 | W-10 | 8.6 | C-1 | 280 | 26 | 0.6 | 12.1 |
| 21 | G-2 | W-11 | 8.3 | C-1 | 280 | 26 | 0.6 | 12.1 |
| 22 | G-2 | W-12 | 8.4 | C-1 | 280 | 26 | 0.6 | 12.1 |
| 23 | G-2 | W-13 | 8.4 | C-1 | 280 | 26 | 0.6 | 12.1 |
| 24 | G-2 | W-14 | 9.7 | C-1 | 280 | 26 | 0.6 | 12.1 |
| 25 | G-2 | W-15 | 9.8 | C-1 | 280 | 26 | 0.6 | 12.1 |
| 26 | G-2 | W-16 | 10.1 | C-1 | 280 | 26 | 0.6 | 12.1 |
| 27 | G-2 | W-17 | 8.4 | C-1 | 280 | 26 | 0.6 | 12.1 |
| 28 | G-2 | W-18 | 8.8 | C-1 | 280 | 26 | 0.6 | 12.1 |
| 29 | G-2 | W-19 | 8.6 | C-1 | 280 | 26 | 0.6 | 12.1 |
| 30 | G-2 | W-20 | 8.5 | C-1 | 280 | 26 | 0.6 | 12.1 |
| 31 | G-2 | W-21 | 9.6 | C-1 | 280 | 26 | 0.6 | 12.1 |

TABLE 5-continued

| Test Example | Shielding gas | Wire No. | Parameter β | Welding conditions | Current [A] | Voltage [V] | Welding speed [cm/s] | Welding heat input [kJ/cm] |
|---|---|---|---|---|---|---|---|---|
| 32 | G-2 | W-22 | 8.9 | C-1 | 280 | 26 | 0.6 | 12.1 |
| 33 | G-2 | W-23 | 9.1 | C-1 | 280 | 26 | 0.6 | 12.1 |
| 34 | G-2 | W-24 | 8.2 | C-1 | 280 | 26 | 0.6 | 12.1 |
| 35 | G-2 | W-25 | 8.1 | C-1 | 280 | 26 | 0.6 | 12.1 |
| 36 | G-2 | W-26 | 9.1 | C-1 | 280 | 26 | 0.6 | 12.1 |
| 37 | G-2 | W-27 | 8.8 | C-1 | 280 | 26 | 0.6 | 12.1 |
| 38 | G-2 | W-28 | 9.0 | C-1 | 280 | 26 | 0.6 | 12.1 |
| 39 | G-2 | W-29 | 9.3 | C-1 | 280 | 26 | 0.6 | 12.1 |
| 40 | G-2 | W-30 | 10.0 | C-1 | 280 | 26 | 0.6 | 12.1 |
| 41 | G-2 | W-31 | 9.2 | C-1 | 280 | 26 | 0.6 | 12.1 |
| 42 | G-2 | W-32 | 9.5 | C-1 | 280 | 26 | 0.6 | 12.1 |
| 43 | G-2 | W-33 | 8.7 | C-1 | 280 | 26 | 0.6 | 12.1 |
| 44 | G-2 | W-34 | 9.0 | C-1 | 280 | 26 | 0.6 | 12.1 |
| 45 | G-2 | W-35 | 8.5 | C-1 | 280 | 26 | 0.6 | 12.1 |
| 46 | G-2 | W-36 | 8.4 | C-1 | 280 | 26 | 0.6 | 12.1 |
| 47 | G-2 | W-37 | 12.1 | C-1 | 280 | 26 | 0.6 | 12.1 |
| 48 | G-2 | W-38 | 9.1 | C-1 | 280 | 26 | 0.6 | 12.1 |
| 49 | G-2 | W-39 | 9.0 | C-1 | 280 | 26 | 0.6 | 12.1 |
| 50 | G-2 | W-40 | 10.6 | C-1 | 280 | 26 | 0.6 | 12.1 |
| 51 | G-2 | W-41 | 12.9 | C-1 | 280 | 26 | 0.6 | 12.1 |
| 52 | G-2 | W-42 | 10.8 | C-1 | 280 | 26 | 0.6 | 12.1 |
| 53 | G-2 | W-43 | 9.0 | C-1 | 280 | 26 | 0.6 | 12.1 |
| 54 | G-2 | W-44 | 8.2 | C-1 | 280 | 26 | 0.6 | 12.1 |
| 55 | G-2 | W-45 | 11.3 | C-1 | 280 | 26 | 0.6 | 12.1 |
| 56 | G-2 | W-46 | 13.0 | C-1 | 280 | 26 | 0.6 | 12.1 |
| 57 | G-2 | W-47 | 10.7 | C-1 | 280 | 26 | 0.6 | 12.1 |
| 58 | G-2 | W-48 | 9.1 | C-1 | 280 | 26 | 0.6 | 12.1 |
| 59 | G-2 | W-49 | 8.2 | C-1 | 280 | 26 | 0.6 | 12.1 |
| 60 | G-8 | W-11 | 13.3 | C-1 | 280 | 27 | 0.6 | 12.6 |
| 61 | G-8 | W-22 | 13.9 | C-1 | 280 | 27 | 0.6 | 12.6 |
| 62 | G-8 | W-29 | 14.3 | C-1 | 280 | 27 | 0.6 | 12.6 |
| 63 | G-8 | W-35 | 13.5 | C-1 | 280 | 27 | 0.6 | 12.6 |
| 64 | G-8 | W-42 | 15.8 | C-1 | 280 | 27 | 0.6 | 12.6 |
| 65 | G-8 | W-46 | 18.0 | C-1 | 280 | 27 | 0.6 | 12.6 |
| 66 | G-1 | W-5 | 0.1 | C-2 | 370 | 31 | 0.6 | 19.1 |
| 67 | G-2 | W-10 | 8.6 | C-2 | 370 | 32 | 0.6 | 19.7 |

TABLE 6

| | (Volume fraction) | | | |
|---|---|---|---|---|
| Symbol | [Ar] | [$O_2$] | [$CO_2$] | [$CO_2$] + 3[$O_2$] |
| G-1 | 100 | 0 | 0 | 0 |
| G-2 | 97 | 3 | 0 | 9 |
| G-3 | 96 | 4 | 0 | 12 |
| G-4 | 95 | 5 | 0 | 15 |
| G-5 | 91 | 0 | 9 | 9 |
| G-6 | 88 | 0 | 12 | 12 |
| G-7 | 85 | 0 | 15 | 15 |
| G-8 | 92 | 3 | 5 | 14 |
| G-9 | 90 | 10 | 0 | 30 |
| G-10 | 80 | 0 | 20 | 20 |
| G-11 | 91 | 4 | 5 | 17 |

TABLE 7

| | Weldability | | | | Corrosion resistance | |
|---|---|---|---|---|---|---|
| Test Example | Slag removability | Amount of spatter generation | Bead shape | Defect resistance | Rating number | Evaluation result |
| 1 | A | A | A | A | 10 | A |
| 2 | A | A | A | A | 10 | A |
| 3 | B | B | A | A | 8 | C |
| 4 | C | B | A | A | 6 | C |
| 5 | A | A | A | A | 10 | A |
| 6 | B | B | A | A | 9 | B |
| 7 | C | B | A | A | 7 | C |
| 8 | C | C | A | A | 8 | C |
| 9 | D | D | A | A | 3 | C |
| 10 | D | D | A | A | 4 | C |
| 11 | D | C | A | A | 4 | C |
| 12 | B | A | C | C | 6 | C |
| 13 | A | A | B | A | 8 | C |
| 14 | A | A | A | A | 10 | A |
| 15 | A | A | A | A | 10 | A |
| 16 | C | A | A | A | 10 | A |

TABLE 7-continued

| Test Example | Slag removability | Weldability Amount of spatter generation | Bead shape | Defect resistance | Corrosion resistance Rating number | Evaluation result |
|---|---|---|---|---|---|---|
| 17 | D | A | A | A | 8 | C |
| 18 | C | B | C | C | 7 | C |
| 19 | B | B | B | A | 8 | C |
| 20 | A | A | A | A | 10 | A |
| 21 | A | A | A | B | 10 | A |
| 22 | A | A | B | B | 10 | A |
| 23 | B | A | C | C | 8 | C |
| 24 | B | B | C | C | 6 | C |
| 25 | C | A | B | A | 6 | C |
| 26 | B | A | A | A | 9.3 | B |
| 27 | B | A | A | A | 9 | B |
| 28 | B | A | A | A | 9 | B |
| 29 | B | A | B | A | 8 | C |
| 30 | C | A | C | C | 5 | C |
| 31 | A | A | A | A | 10 | A |
| 32 | A | A | A | A | 10 | A |
| 33 | A | A | A | B | 10 | A |
| 34 | A | A | A | C | 10 | A |
| 35 | D | A | A | B | 2 | D |
| 36 | C | C | B | A | 4 | C |
| 37 | B | C | B | A | 6 | C |
| 38 | A | B | A | A | 9 | B |
| 39 | A | A | A | A | 10 | A |
| 40 | A | A | B | A | 10 | A |
| 41 | A | A | B | A | 10 | A |
| 42 | B | A | B | B | 7 | C |
| 43 | C | B | B | B | 4 | C |
| 44 | B | A | B | B | 6 | C |
| 45 | A | A | A | A | 10 | A |
| 46 | A | A | A | A | 10 | A |
| 47 | A | A | A | A | 10 | A |
| 48 | A | A | A | A | 10 | A |
| 49 | — | B | A | A | 2 | D |
| 50 | A | A | A | A | * | * |
| 51 | A | A | A | A | * | * |
| 52 | A | A | A | A | * | * |
| 53 | A | A | A | A | * | * |
| 54 | A | A | A | A | * | * |
| 55 | A | A | A | A | * | * |
| 56 | A | A | A | A | * | * |
| 57 | A | A | A | A | * | * |
| 58 | A | A | A | A | * | * |
| 59 | A | A | A | A | * | * |
| 60 | B | B | A | A | 8 | C |
| 61 | B | B | A | A | 4 | C |
| 62 | B | B | A | A | 7 | C |
| 63 | A | B | A | A | 10 | A |
| 64 | B | B | A | A | * | * |
| 65 | B | B | A | A | * | * |
| 66 | B | C | B | A | 9 | B |
| 67 | B | C | B | A | 7 | C |

Test Examples 1 to 11 are test examples in which the composition of the shielding gas was changed. The results showed that, as the Ar ratio in the shielding gas decreased, and as the value represented by $\{[CO_2]+(3\times[O_2])\}$ increased, slag removability deteriorated and the amount of spatter generation increased.

Test Examples 12 to 49 are test examples in which flux-cored wires for stainless steel were used and the composition thereof was changed. Weld metals having good slag removability, good bead shapes, and good defect resistance were obtained by making the alloy component composition appropriate. Test Example 48 excels in each of slag removability, weldability, and corrosion resistance. However, since a flux-cored wire containing low-melting-point elements such as As, Sb, Pb, and Bi was used, the results showed low reheat cracking resistance.

Test Examples 50 to 59 are test examples in which flux-cored wires for Ni-based alloys were used. The results showed that good slag removability and good weldability were obtained when the wire compositions were within ranges that satisfy the ranges of the present invention.

Test Examples 60 to 67 are test examples in which the shielding gas, the wire compositions, and the welding conditions were changed. The results showed that good slag removability, good weldability, and good corrosion resistance were obtained when the shielding gas, the wire compositions, and the welding conditions were within ranges that satisfy the ranges of the present invention.

It was also confirmed that welding using each of the wires that satisfy the ranges of the present invention can form good weld metals even under a high heat input condition of 12.0 kJ/cm or more, and welding at high efficiency can be realized.

The present application is based on Japanese Patent Application (Japanese Patent Application No. 2017-226089) filed Nov. 24, 2017, the entire contents of which are incorporated herein by reference.

The invention claimed is:

1. A flux-cored wire, comprising:
a sheath and
a flux that fills the sheath,
wherein the flux-cored wire is suitable for gas-shielded arc welding, as a shielding gas, a gas, comprising $O_2$, $CO_2$ and Ar, that satisfies relationships of $0\% \leq [O_2] \leq 5\%$, $0\% \leq [CO_2] \leq 15\%$, and $\{[CO_2]+(3\times[O_2])\} \leq 15$ where $[O_2]$ represents a volume fraction of oxygen and $[CO_2]$ represents a volume fraction of carbon dioxide,
the flux-cored wire comprises substantially no As, Sb, Pb, or Bi,
a composition of a slag component in the flux-cored wire satisfies, in terms of mass fraction with respect to a total mass of the flux-cored wire,
$TiO_2$: 4.00% to 9.00%,
$SiO_2$: 0.30% to 2.00%,
$ZrO_2$: 1.50% to 3.00%,
$Al_2O_3$: 0.17% or less, and
MgO: 0.50% or less,
wherein the slag component does not comprise rare earth metal oxides,
wherein the composition of the slag component further satisfies:
a total of values obtained by converting alkali metal components contained in a Na compound, a K compound, and a Li compound into $Na_2O$, $K_2O$, and $Li_2O$, respectively, in terms of mass fraction with respect to the total mass of the flux-cored wire: 0.25% to 1.50%,
an amount of F contained as a metal fluoride in the flux-cored wire: 0.05% to 0.80%,
$Fe_2O_3$: 0.15% to 0.50%, and
an incidental metal oxide: 0.20% or less,
a composition of an alloy component contained in the sheath and the flux of the flux-cored wire satisfies, in terms of mass fraction with respect to the total mass of the flux-cored wire,
C: 0.005% to 0.150%,
Si: 0.05% to 1.50%,
Mn: 0.20% to 3.00%,
Cr: 15.00% to 35.00%,
Ni: 5.00% to 25.00%,
Mo: 5.00% or less,
Nb: 2.00% or less,
Ti: 1.00% or less,
N: 0.04% or less,
the balance: Fe and incidental impurities, and
a relationship $\{(3\times[O_2])+[CO_2]+(0.0085\times A^2)-(0.19\times A)\} \leq 20.0$ is satisfied
where [Cr] represents a mass fraction of the Cr and [Nb] represents a mass fraction of the Nb with respect to the total mass of the flux-cored wire, and $A=\{[Cr]+(4.3\times[Nb])\}$.

2. The flux-cored wire according to claim 1, wherein the composition of the slag component satisfies a relationship $$1.15 \leq [\{3\times([ZrO_2]+[MgO])\}+(1.2\times[Al_2O_3])+[TiO_2]+(0.3\times[SiO_2])]/([TiO_2]+[SiO_2]+[ZrO_2]+[Al_2O_3]+[MgO]) \leq 1.75$$

where $[TiO_2]$ represents a mass fraction of the $TiO_2$, $[SiO_2]$ represents a mass fraction of the $SiO_2$, $[ZrO_2]$ represents a mass fraction of the $ZrO_2$, $[Al_2O_3]$ represents a mass fraction of the $Al_2O_3$, and [MgO] represents a mass fraction of the MgO with respect to the total mass of the flux-cored wire.

3. The flux-cored wire according to claim 1, wherein
a content of the flux in the flux-cored wire is 8.0% to 30.0% in terms of mass fraction with respect to the total mass of the flux-cored wire, and
a content of the slag component in the flux is 7.0% to 15.0% in terms of mass fraction with respect to the total mass of the flux-cored wire.

4. A welding method comprising:
performing welding by using the flux-cored wire according to claim 1 with a welding heat input (F) in a range of $10.0 \leq F \leq 19.0$, the welding heat input being represented by a formula below:

Welding heat input (F) (kJ/cm)=current (A)×voltage (V)/welding speed (cm/s)/1000.

5. A flux-cored wire, comprising:
a sheath; and
a flux that fills the sheath;
wherein the flux-cored wire is suitable for gas-shielded arc welding, as a shielding gas, a gas, comprising $O_2$, $CO_2$ and Ar, that satisfies relationships of $0\% \leq [O_2] \leq 5\%$, $0\% \leq [CO_2] \leq 15\%$, and $\{[CO_2]+(3\times[O_2])\} \leq 15$ where $[O_2]$ represents a volume fraction of oxygen and $[CO_2]$ represents a volume fraction of carbon dioxide,
the flux-cored wire comprises substantially no As, Sb, Pb, or Bi,
a composition of a slag component in the flux-cored wire satisfies, in terms of mass fraction with respect to a total mass of the flux-cored wire,
$TiO_2$: 4.00% to 9.00%,
$SiO_2$: 0.30% to 2.00%,
$ZrO_2$: 1.50% to 3.00%,
$Al_2O_3$: 0.17% or less, and
MgO: 0.50% or less,
wherein the slag component does not comprise rare earth metal oxides,
wherein the composition of the slag component further satisfies:
a total of values obtained by converting alkali metal components contained in a Na compound, a K compound, and a Li compound into $Na_2O$, $K_2O$, and $Li_2O$, respectively, in terms of mass fraction with respect to the total mass of the flux-cored wire: 0.25% to 1.50%,
an amount of F contained as a metal fluoride in the flux-cored wire: 0.05% to 0.80%,
$Fe_2O_3$: 0.15% to 0.50%, and
an incidental metal oxide: 0.20% or less,
a composition of an alloy component contained in the sheath and the flux of the flux-cored wire satisfies, in terms of mass fraction with respect to the total mass of the flux-cored wire,
C: 0.005% to 0.150%,
Si: 0.05% to 1.00%,
Mn: 0.10% to 4.00%,
Cr: 10.00% to 35.00%,
Fe: 0.10% to 10.00%,
W: 5.00% or less,
Mo: 20.00% or less,
Nb: 4.50% or less,
Co: 2.50% or less,
Ti: 1.00% or less,
N: 0.04% or less,
the balance: Ni and incidental impurities, and
a relationship $(3\times[O_2])+[CO_2]+(0.0085\times A^2)-(0.19\times A)\} \leq 20.0$ is satisfied where [Cr] represents a mass fraction of the Cr and [Nb] represents a mass fraction of the Nb with respect to the total mass of the flux-cored wire, and A=[[Cr]+(4.3×[Nb])}.

6. A welding method comprising:
performing welding by using the flux-cored wire according to claim 5 with a welding heat input (F) in a range of 10.0≤F≤19.0, the welding heat input being represented by a formula below:

Welding heat input (F) (kJ/cm)=current (A)×voltage (V)/welding speed (cm/s)/1000.

* * * * *